US007887687B2

(12) United States Patent
Wei et al.

(10) Patent No.: US 7,887,687 B2
(45) Date of Patent: Feb. 15, 2011

(54) METHOD AND SYSTEM FOR COATING A WORKPIECE

(75) Inventors: Nan Wei, Moline, IL (US); Brian P. Burghgrave, Geneseo, IL (US)

(73) Assignee: Deere & Company, Moline, IL (US)

( * ) Notice: Subject to any disclaimer, the term of this patent is extended or adjusted under 35 U.S.C. 154(b) by 1212 days.

(21) Appl. No.: 11/507,768

(22) Filed: Aug. 22, 2006

(65) Prior Publication Data

US 2008/0050533 A1 Feb. 28, 2008

(51) Int. Cl.
*B01D 57/02* (2006.01)

(52) U.S. Cl. ....................................... 204/471; 204/272

(58) Field of Classification Search ................. 204/272, 204/471; 205/316

See application file for complete search history.

(56) References Cited

U.S. PATENT DOCUMENTS

| | | | | |
|---|---|---|---|---|
| 2,699,426 | A | | 1/1955 | Hoffman |
| 3,361,658 | A | | 1/1968 | Tanner |
| 3,650,932 | A | | 3/1972 | Turner |
| 3,922,213 | A | | 11/1975 | Smith et al. |
| 4,107,016 | A | * | 8/1978 | Brower et al. ............... 204/479 |
| 4,750,981 | A | * | 6/1988 | Dalland et al. .......... 204/224 R |
| 5,152,466 | A | | 10/1992 | Matushita et al. |
| 5,512,154 | A | * | 4/1996 | Rischke et al. .............. 204/204 |
| 2006/0091020 | A1 | * | 5/2006 | Hossick-Schott et al. ... 205/333 |

FOREIGN PATENT DOCUMENTS

| | | |
|---|---|---|
| JP | 3196860 | 8/1991 |

* cited by examiner

*Primary Examiner*—Luan V Van
(74) *Attorney, Agent, or Firm*—Yee & Associates, P.C.; Dawn C. Wolff

(57) ABSTRACT

A system and method for coating a desired portion of the workpiece with a layer of paint comprises an upper reservoir for storing paint. A female shell has at least two sections joined together to generally surround the workpiece with a gap. An energy source applies a first voltage of a first polarity to at least one of the shell, a conductive layer of the shell, or conductive inlet associated with the shell. The energy source provides a ground or a second voltage of a second polarity, which is different in polarity to the first polarity, to the workpiece. A lower reservoir receives excess paint that flows off the workpiece. A foam reduction module receives the excess paint positioned between the workpiece and the lower reservoir.

22 Claims, 10 Drawing Sheets

311

METHOD AND SYSTEM FOR COATING A WORKPIECE

FIELD OF THE INVENTION

This invention relates to a method and system for coating a workpiece.

BACKGROUND OF THE INVENTION

A metal or alloy workpiece may be coated by applying paint via a conventional electrophoresis coating (E-coat) process. There are several problems that are associated with standard electrophoresis coating processes. One problem is that electrophoresis coating typically requires a large reservoir of liquid paint for dipping a part to be painted. The paint in the large reservoir is often expensive to change or replace, which limits technical improvements that can be made economically. Another problem is that electrophoresis coating is not generally applicable to painting engines or transmissions because the hydrostatic pressure on the paint tends to force it into the interior of the engine or transmission through any small openings (e.g., around engine or transmission shafts). Accordingly, there is a need for a flow-coat electrophoresis process, which does not dip any parts into a pool of liquid paint.

Conventional flow-coat, electrophoresis process have been troubled with several technical problems. A first problem is that as excess paint drains or drips from one or more surfaces of the workpiece, air may become trapped in the paint and it may foam. Accordingly, there is a need to reduce the foaming of the paint under such circumstances so that the excess paint may be reused to coat other workpieces with high quality finishes. A second problem is to attain adequate control over covering all of the surfaces with the paint to a desired degree of thickness. A third problem is to prevent the paint in its liquid state from entering the cavities, openings, or shafts of certain workpieces. A fourth problem is to provide sufficient electrical current flux density to attract the paint to the workpiece.

SUMMARY OF THE INVENTION

A system and method for coating a desired portion of the workpiece with a layer of paint comprises a source or emitter of paint (e.g., an upper reservoir). A female shell has at least two sections joined together to generally surround the workpiece with a gap. An energy source applies a first voltage of first polarity to at least one of the shell, a conductive layer of the shell, or conductive inlet associated with the shell. The energy source provides a ground or a second voltage of second polarity to the workpiece. The second polarity is different in polarity than the first polarity. A lower reservoir receives excess paint that flows off the workpiece. A foam reduction module receives the excess paint positioned between the workpiece and the lower reservoir.

DESCRIPTION OF THE PREFERRED EMBODIMENTS

Figure 1:
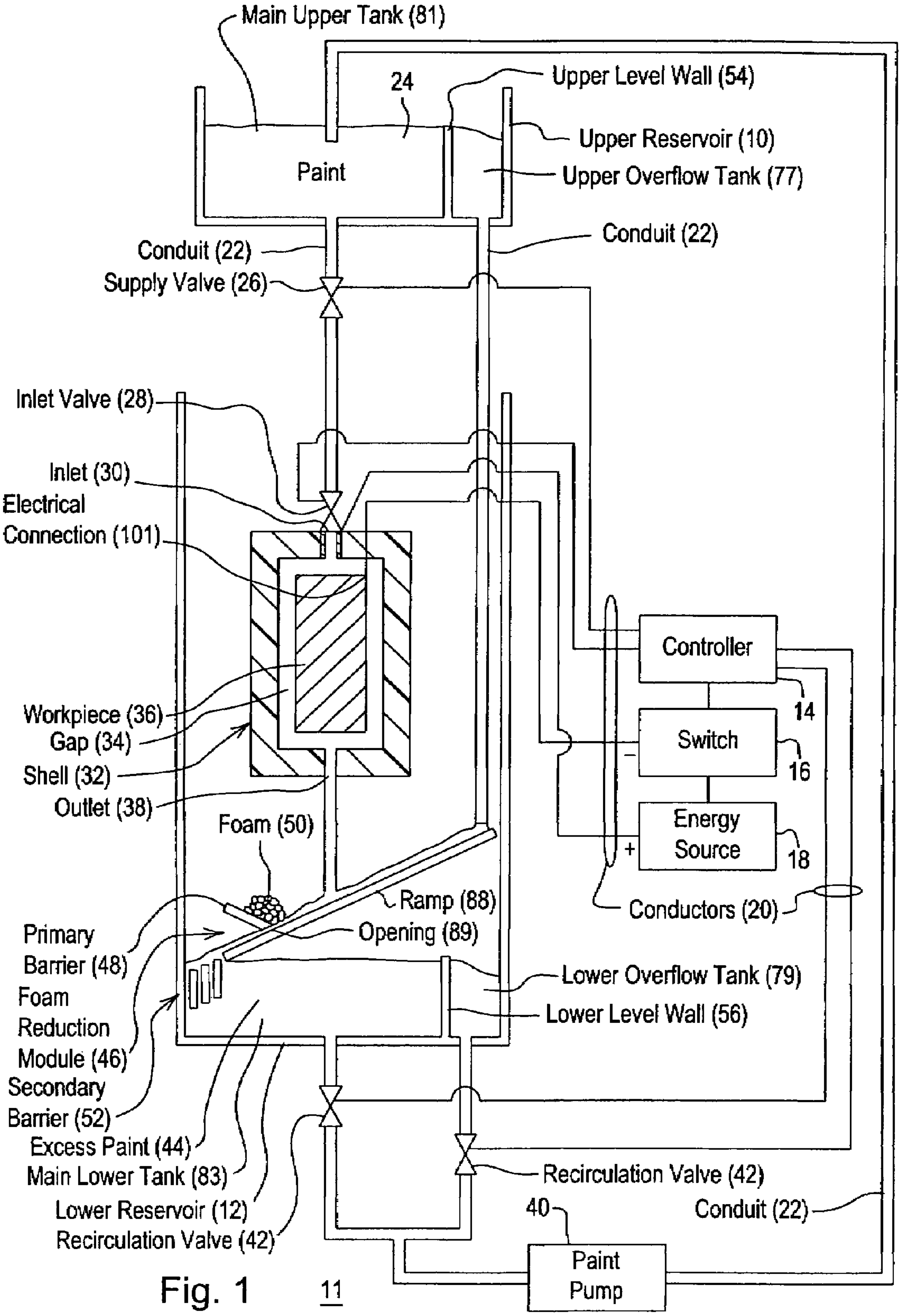
FIG. 1 is a block diagram of a first embodiment of a system for coating a desired portion of the workpiece with a layer of paint.

FIG. 1 shows a first embodiment of a coating system 11 for coating a desired portion of a workpiece 36 with a layer of paint. The coating system 11 comprises a source or emitter of paint (e.g., electrophoretic paint emulsion or paint comprising paint particles suitable for electrophoresis, cataphoresis, and/or electrodeposition). Although the source comprises an upper reservoir 10 for storing paint as shown in FIG. 1, the source may comprise the combination of the conduit 22 and paint pump 40 for feeding paint to the female shell 32. The upper reservoir 10 is coupled to an inlet 30 of a female shell 32 via a conduit 22. The conduit 22 has a supply valve 26 to regulate the flow of paint from upper reservoir 10 to the inlet 30 and an inlet valve 28 to control the flow of paint 24 into an inlet 30 and interior of the female shell 32. The female shell 32 has at least two sections joined together to generally surround the workpiece 36 with a gap 34 (e.g., an air gap) or spatial volume. The female shell 32 has an outlet 38 near its lower portion or bottom. The two sections of the female shell 32 are associated with a seal to hermetically seal the gap 34 such that the paint exits from the outlet 38 of the female shell 32. In FIG. 1, the shell 32 may be composed of an electrically conductive material or metal to facilitate electrophoresis, cataphoresis, and/or electrodeposition. However, the shell 32 may be composed of a polymer or a dielectric if the coating process does not use electrophoresis, cataphoresis, and/or electrodeposition.

In one embodiment, an energy source 18 applies a first voltage of first polarity to one or more conductive inlets 30 and the paint (e.g., paint comprising paint particles suitable for electrophoresis, cataphoresis, and/or electrodeposition), and a second voltage of a second polarity to the workpiece 36. The second polarity is different than the first polarity. The second polarity is opposite the first polarity or neutral (e.g., grounded); a voltage difference may exist between the first voltage and the second voltage. For example, if the first polarity is positive, the second polarity is negative or neutral. Similarly, if the first polarity is negative, the second polarity is positive or neutral. Although certain polarities are shown in FIG. 1, for illustrative purposes, the polarities may differ or be opposite from those shown.

In general, an electric field may be established between the shell 32 (if it is electrically conductive) and the workpiece 36. Alternately, if the shell 32 is composed of a dielectric as shown in FIG. 1, an electric field may be established between one or more conductive inlets 30 and the workpiece 36 in the vicinity of the inlets 30 (e.g., for coating a specific targeted area of the workpiece 36 with paint). Areas of the workpiece 36 that are not exposed to a sufficient electric field for a desired thickness of paint deposition near one or more inlets 30 might be masked (e.g., with a polymeric or dielectric mask or coating that is generally non-soluble in the paint or its solvent) to prevent the deposition of paint, for example.

In an alternative embodiment of the system 11 of FIG. 1, the energy source 18 and the switch 16 may be omitted because of any of the following: (a) the shell 32 is not electrically conductive, (b) the workpiece 36 is not electrically conductive or metallic, or the workpiece 36 has already been coated with a dielectric layer of paint and an additional coat of paint is required, (c) the paint is not suitable for electrophoresis, cataphoresis, or electrodeposition or (d) the painting process will not use electrophoresis, cataphoresis or electrodeposition (e.g., for a targeted surface area of the workpiece 36 associated with an electric field of suitable intensity between the conductive inlet 30 and the workpiece 36).

A lower reservoir 12 receives excess paint 44 that flows off or drains from the workpiece 36. A foam reduction module 46 receives the excess paint 44 positioned between the workpiece 36 and the lower reservoir 12. The lower reservoir 12 is associated with a paint pump 40 that recirculates paint to the upper reservoir 10 via a conduit 22. The lower reservoir 12 may be associated with one or more recirculation valves 42.

A controller 14 may be coupled to a switch 16 to provide a signal indicative of an off status or an on status of the system 11. In turn, the switch 16 is coupled to an energy source 18 (e.g., direct current source). The energy source 18 has several possible polarity configurations with respect to any electric field established between the workpiece and the shell 32 (or the conductive inlet 30). Under a first polarity configuration, if a first terminal of the energy source 18 is positive and if the first terminal is associated with the workpiece 36, the workpiece 36 is regarded as a cathode. Accordingly, if the second terminal of the energy source 18 is negative or neutral and if the second terminal is associated with the conductive inlet 30 of the shell 32 in FIG. 1, the conductive inlet 30 represents an anode. The second terminal may be associated with a switch 16 to control whether or not a voltage is applied during coating or painting of the workpiece 36.

Under a second polarity configuration, if a first terminal of the energy source 18 is negative and if the first terminal is associated with the workpiece 36, the workpiece 36 is regarded as an anode. Accordingly, if the second terminal of the energy source 18 is positive or neutral and if the second terminal is associated with an inlet 30 of the shell 32 in FIG. 1, the inlet 30 represents a cathode.

The controller 14 may generate one or more control signals for controlling various valves (26, 28, 42) via conductors 20. Each valve (26, 28, 42) may comprise an electromechanical valve, and electro-hydraulic valve, a solenoid-controlled valve, or the like. The controller 14 may control one or more of the following valves: a supply valve 26, an inlet 30 valve, and one or more recirculation valves 42.

In an alternate embodiment, the energy source 18 may have an adjustable voltage level to support adjustment of the voltage applied during coating to compensate for variations in the size, shape, and conductivity of the workpiece 36. For example, the voltage difference between the terminals of the energy source 18 may be increased to increase an electrical field or electrostatic field applied during the coating, which in turn may be used to increase a thickness of the deposited paint on the surface of the workpiece 36.

The foam reduction module 46 may comprise a sloped or tilted ramp 88 having a primary barrier 48 that is generally angled with respect to the titled ramp 88. For example, the primary barrier 48 is generally perpendicular to the titled ramp 88 or falls within a range from approximately 90 degrees to 150 degrees with respect to the titled ramp 88. The titled ramp 88 itself prevents or reduces the formation of foam or air bubbles in the excess paint 44 by preventing the excess paint 44 from splashing into or directly, turbulently entering the lower reservoir 12.

The excess paint 44 flows downward on the tilted ramp to the primary barrier 48, where foam 50 is diverted or separated from the paint to further reduce or prevent foam formation in the excess paint recycled to the lower reservoir 12. The primary barrier 48 is associated with a lower portion with an opening 89 or lower passage for the paint, and an upper portion for catching or trapping foam 50 and air bubbles in the paint. The opening 89 in the lower portion may have a circular, oval, elliptical, rectangular, curved, funnel, or other geometric shape.

In one configuration, a second barrier 52 is associated with a lower end of the sloped ramp 88 and prevents paint from splashing, turbulence, or foaming upon entry into the lower reservoir 12 from the sloped ramp 88. The second barrier 52 may comprise a series of plates that are generally vertically spaced apart from each other so as to minimize the turbulence of the excess paint 44 flowing in to the lower reservoir 12. The series of plates of the second barrier 52 may be vertically offset from one another, but need to be vertically offset, to form a slope in the same direction as the titled plate.

Accordingly, in the embodiment of FIG. 1, the foam reduction module 46 has as many as three stages for foam reduction and prevention in the paint. The first stage comprises the sloped ramp 88, the second stage comprises the primary barrier 48, and the third stage comprises the second barrier 52. In alternate embodiments, it is understood that one or more stages may be deleted from the foam reduction module 46 and still fall within the scope of the invention.

In an alternate embodiment, a foam reduction module 46 (or one or more of its constituent stages) may be associated with the upper reservoir 10 to prevent paint from splashing, turbulence or foaming upon entry into the upper reservoir 10 from the conduit 22 and pump 40. Air bubbles or foaming might be introduced by the pump 40, or by entry or flow of paint into the upper reservoir 10. As illustrated, if an end of the conduit 22 is extended into the paint or a small distance above the paint in the upper reservoir 10, turbulence and foam may be minimized somewhat.

The pump 40 recycles the excess paint 44 by pumping paint from the lower reservoir 12 to the upper reservoir 10. The lower level wall 56 forms a boundary between a main lower tank 83 and a lower overflow tank 79. The controller 14 may control the level of excess paint 44 by the lower level wall 56 or a level detector (e.g., float or optical level detector) that activates or deactivates the paint pump 40 and one or more recirculation valves 42 to maintain a desired level of excess paint 44 within the lower reservoir 12. It should be noted that the term "excess paint 44", as used herein, refers to paint is excess with respect to the workpiece 36, and does not imply that the lower reservoir 12 is overfilled or overflowing.

The controller 14 may control the level of paint 44 by the upper level wall 54 or level detector (e.g., float or optical level detector) that deactivates or activates the paint pump 40 and one or more recirculation valves 42 to maintain a desired level of excess paint 44 within the upper reservoir 10. The upper level wall 54 forms a boundary between a main upper tank 81 and an upper overflow tank 77.

The female shell 32 has an interior surface that generally conforms to an exterior surface of the workpiece 36 such that the gap 34 has a generally uniform thickness or another thickness that is desired for the paint coating. The uniform thickness may be measured from a normal projection from at least one of the exterior surface and the interior surface. However, where electrophoresis, cataphoresis or electrodeposition is used, the resultant paint thickness deposited on the workpiece 36 depends upon the voltage level of the energy source 18 and the associated electrical field established.

Various techniques may be applied to painting using the female shell (e.g., 32), which may be applied alternately or cumulatively. Under a first technique, one or more spacers (e.g., insulators or electrically insulating spacers) may be used between the female shell (e.g., 32) and the workpiece 36 to control the alignment or registration of the workpiece 36 with respect to the female shell (e.g., 32) to attain a coating of generally uniform or desired thickness. Under a second technique, one or more seals are mounted in the female shell (e.g., 32) to protect an exterior shaft associated with the workpiece 36 from receiving paint such that no gap 34 exists in the immediate region of the seals. Under a third technique, the female shell (e.g., 32) is molded from the workpiece 36 having a coating of a desired thickness.

Figure 2:
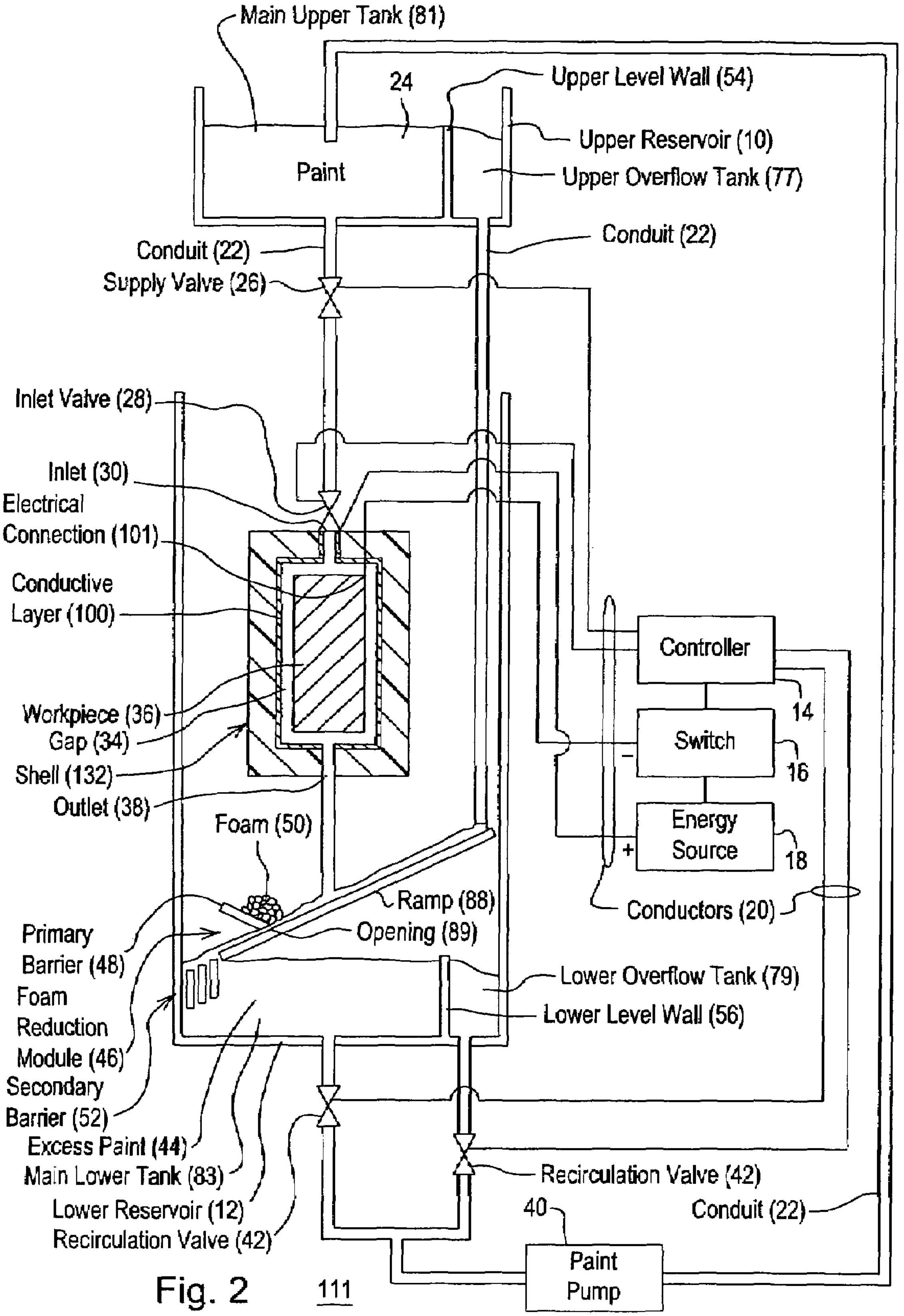
FIG. 2 is a block diagram of a second embodiment of a system for coating a desired portion of the workpiece with a layer of paint.

The coating system 111 of FIG. 2 is similar to the coating system 11 of FIG. 1, except the coating system 111 of FIG. 2 further features a conductive layer 100 lining the female shell 132. Like reference numbers in FIG. 1 and FIG. 2 indicate like elements.

The conductive layer 100 on the interior of the shell 132 may comprise a metallic layer, graphite layer, or another layer that conducts electricity. In one embodiment, the conductive layer 100 (e.g., a metallic layer) may be formed by electroless deposition, chemical vapor deposition, sputtering, electroplating, or otherwise. The conductive layer 100 of FIG. 2 may be charged relative to the workpiece 36 to form an electrical or electrostatic field between the conductive layer 100 and the workpiece 36. The electrical field facilitates the charging of the paint particles, or its solvents, and hence, the paint's electrostatic attraction to the workpiece 36 and/or deposition of paint (e.g., polymers or other constituents within the paint through electrophoresis, cataphoresis and/or electrodeposition) onto the workpiece 36. The electrical energy from the energy source 18 or the switch 16 is routed to the conductive layer 100 via one conductor 20. Another conductor 20 may be connected to the workpiece 36 via an electrical connection 101. Accordingly, if the workpiece 36 is electrically conductive, an electrostatic potential or difference may be established between the shell 132 and the workpiece 36 to facilitate attraction to and deposition (e.g., accumulation) of paint on the workpiece 36.

A controller 14 may be coupled to a switch 16 to provide signal indicative of an on status or off status of the system 111. In turn, the switch 16 is coupled to an energy source 18 (e.g., direct current source). The energy source 18 may have two alternative polarity configurations. Under a first polarity configuration, if a first terminal of the energy source 18 is positive and if the first terminal is associated with the workpiece 36, the workpiece 36 is regarded as a cathode. Accordingly, if the second terminal of the energy source 18 is negative or neutral and if the second terminal is associated with the conductive layer 100 of the shell 132 in FIG. 2, the conductive inlet 30 represents an anode. The second terminal may be associated with a switch 16 to control whether or not a voltage is applied during coating or painting of the workpiece 36.

Under a second polarity configuration, if a first terminal of the energy source 18 is negative and if the first terminal is associated with the workpiece 36, the workpiece 36 is regarded as an anode. Accordingly, if the second terminal of the energy source 18 is positive or neutral and if the second terminal is associated with the conductive layer 100 of the shell 32 in FIG. 1, the inlet 30 represents a cathode.

In one embodiment, an energy source 18 applies a first voltage of first polarity to conductive layer 100 and a second voltage of a second polarity or opposite polarity to the workpiece 36. For example, if the first polarity is positive, the second polarity is negative, and vice versa. Either the first voltage or the second voltage may be, but need not be, grounded or set equal to ground potential. Further, the first voltage and the second voltage may be associated with a relative voltage differential. For example, the first voltage may have an equal, but opposite magnitude to the second voltage. For the system 111 of FIG. 2 and all other embodiments herein with a conductive layer 100, an electrical or electrostatic field is formed between the conductive layer 100 and workpiece 36 (to the extent its surface is conductive or not coated with a dielectric or previous paint) when the energy is applied from the energy source 18. The magnitude of the electrical or electrostatic field is proportional to a voltage difference between a first voltage and a second voltage.

Figure 3:
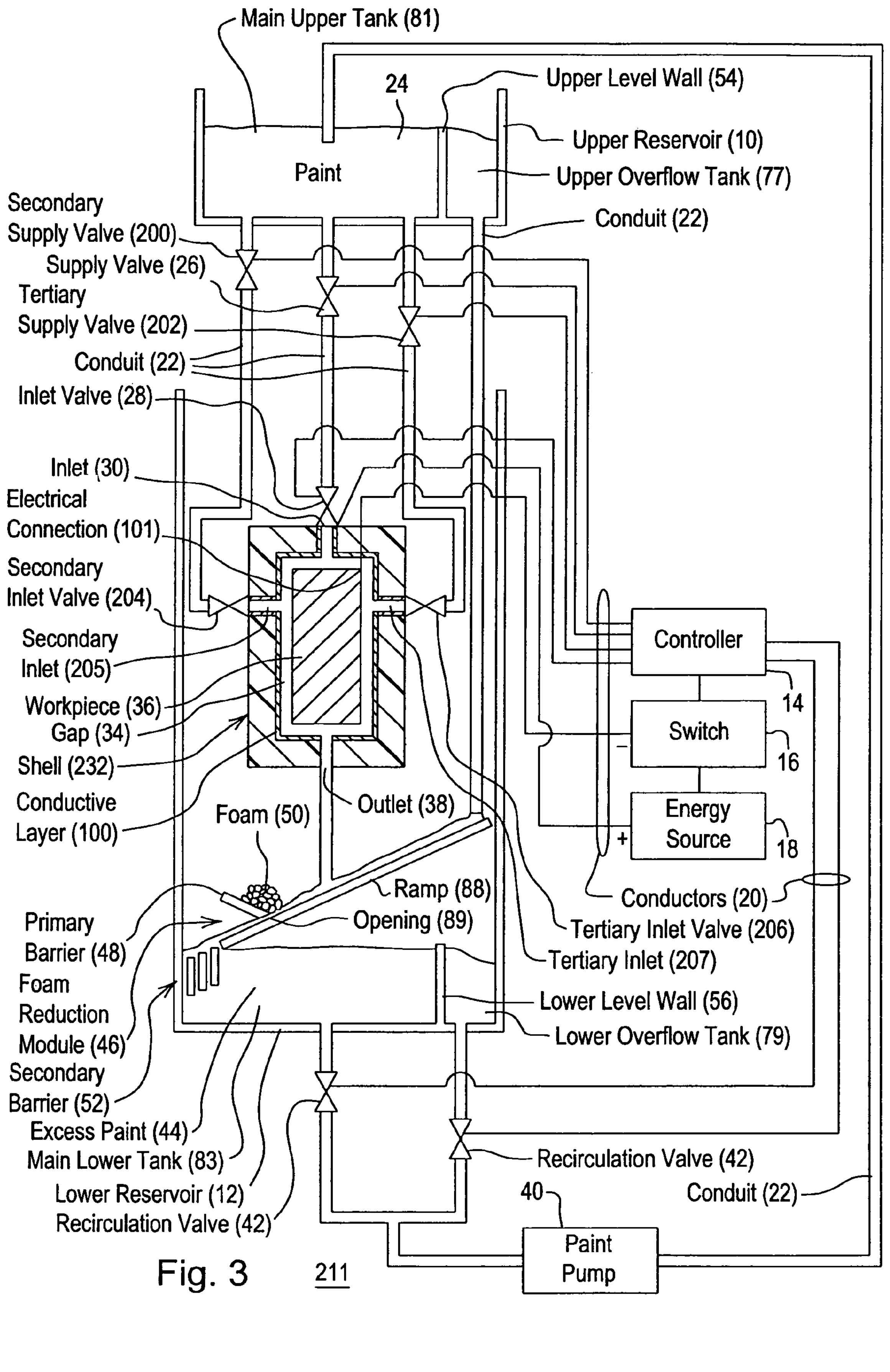
FIG. 3 is a block diagram of a third embodiment of a system for coating a desired portion of the workpiece with a layer of paint.

The coating system 211 of FIG. 3 is similar to the coating system 111 of FIG. 2, except the coating system of FIG. 3 further features multiple inlets (30, 205, and 207) into an interior of shell 232. Like reference numbers in FIG. 1 and FIG. 3 indicate like elements.

The shell 232 has an inlet 30, a secondary inlet 205 and a tertiary inlet 207. The inlet 30 is associated with an inlet valve 28 for controlling the flow or volume of paint entering into an interior of the shell 232. The secondary inlet 205 is associated with a secondary inlet valve 20 for controlling the flow or volume of paint entering into an interior of the shell 232. The tertiary inlet 207 is associated with a tertiary inlet valve 206 for controlling the flow or volume of paint entering into an interior of the shell 232. The flow rate of paint may be adjusted by one or more of the inlet valves (28, 204, and 206) to increase or decrease the rate at which a workpiece 36 (or a particular portion of the workpiece downstream of the corresponding inlet) is painted or coated. As shown in FIG. 3, aggregate flow rate permitted by multiple inlets (30, 205, 207) potentially supports the painting or coating of a greater quantity of workpieces 36 per unit time than with a single inlet 30 of similar dimensions does.

Figure 4:
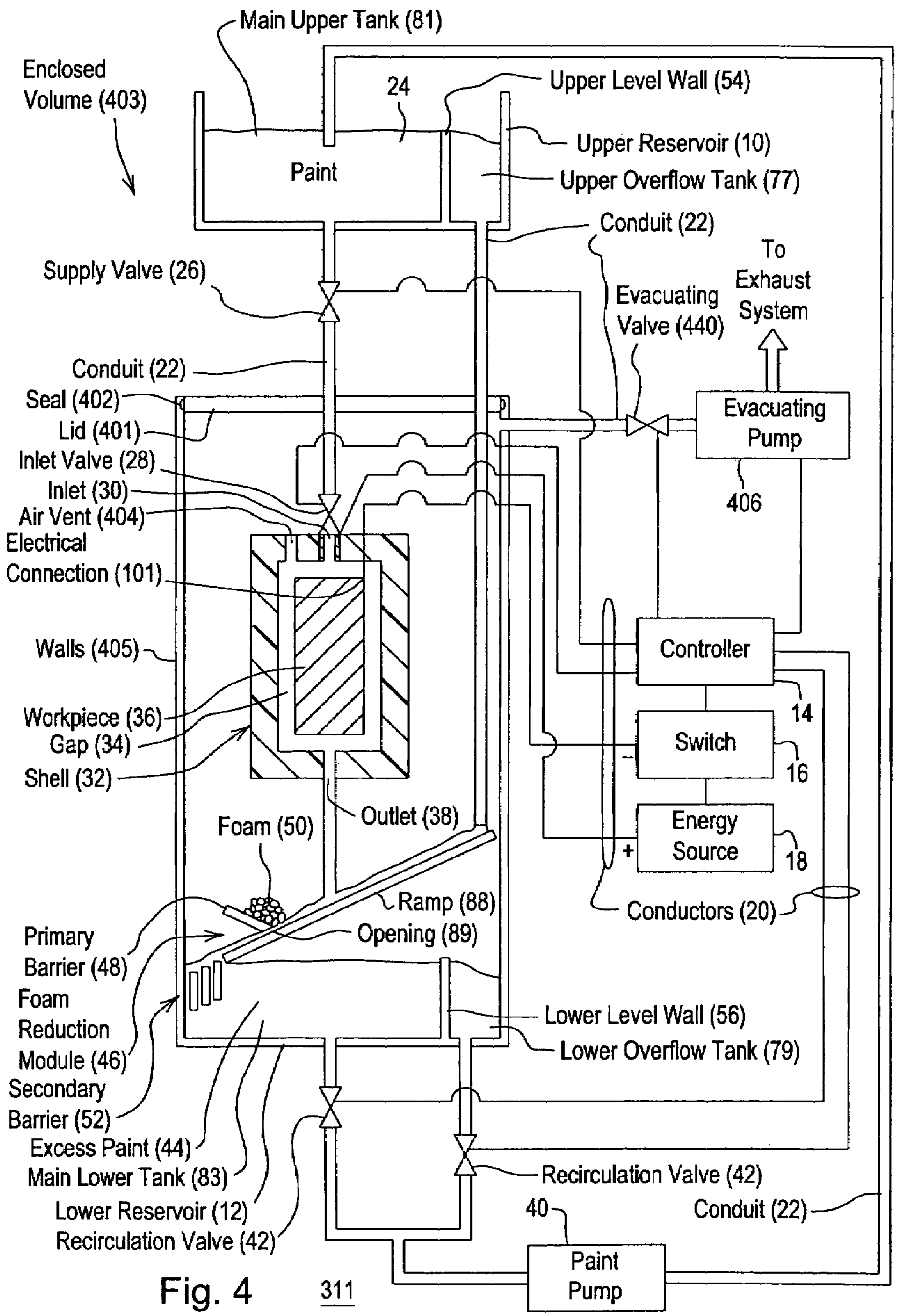
FIG. 4 is a block diagram of a fourth embodiment of a system for coating a desired portion of the workpiece with a layer of paint.

The coating system 311 of FIG. 4 is similar to the coating system 11 of FIG. 1, except the coating system of FIG. 4 is configured to operate at less than ambient environmental pressure. The coating system 311 features an enclosed volume 403 (e.g., an enclosed lower reservoir 12 assembly with a lid 401 and a seal 402) and an air vent 404 in the shell 32. The enclosed volume 403 of FIG. 4 comprises a hermetically sealed container defined by a volume bounded by the lid 401, walls 405, and the lower reservoir 12. The foam reduction module 46 and the shell 32 are located within in the enclosed volume 403. A seal 402 (e.g., a lip seal, rim seal, or compression seal) hermetically seals the lid 401 to support a pressure differential between the enclosed volume 403 and the ambient atmospheric pressure. An air vent 404 in the female shell 32 supports the reduction of the air pressure, hydrostatic pressure of the paint, or both within the gap 34 to that within the enclosed volume 403. That is, the air vent 404 allows the air pressure, hydrostatic pressure, or both within the gap to equalize to the volume air pressure within the enclosed volume 403. The hydrostatic pressure represents the pressure of the paint in its uncured liquid phase, which may vary with the viscosity, solvent, and composition of the paint, for example. The volume air pressure within the enclosed volume 403 may be less than the ambient air pressure external or outside of the enclosed volume 403, for example.

In one embodiment, an evacuating pump 406 is coupled to the enclosed volume 403 to evacuate the air or gas therefrom or to reduce the pressure within at least one of the shell 32 and the enclosed volume 403 to less than the ambient environmental pressure. Although the evacuating pump 406 is coupled to the enclosed volume 403 via conduit and an evacuating valve 440, indirectly or directly controllable by a user or a controller 14, other configurations that may not use an evacuating valve 440 are present. The air vent 404 in the shell 32 reduces the pressure on the contents (e.g., air, solvent vapor, paint, temporary air pockets and temporary voids) in the gap 34 between the workpiece 36 and the shell 32 to less than the ambient pressure.

Accordingly, the paint is not forced into shaft seals or other components of the workpiece 36 that are or were previously filled with air at generally ambient pressure. The paint is discouraged from flowing into shaft seals or other interior volumes of the workpiece 36 that can trap air because of the pressure differential between the gap 34 and the trapped air. Further, paint may be impeded from flowing into shaft seals or other interior volumes of the workpiece taking other precautionary measures (e.g., masking workpiece 36*s* or sealing critical areas with a mask to prevent the ingress of paint or solvent).

Figure 5:
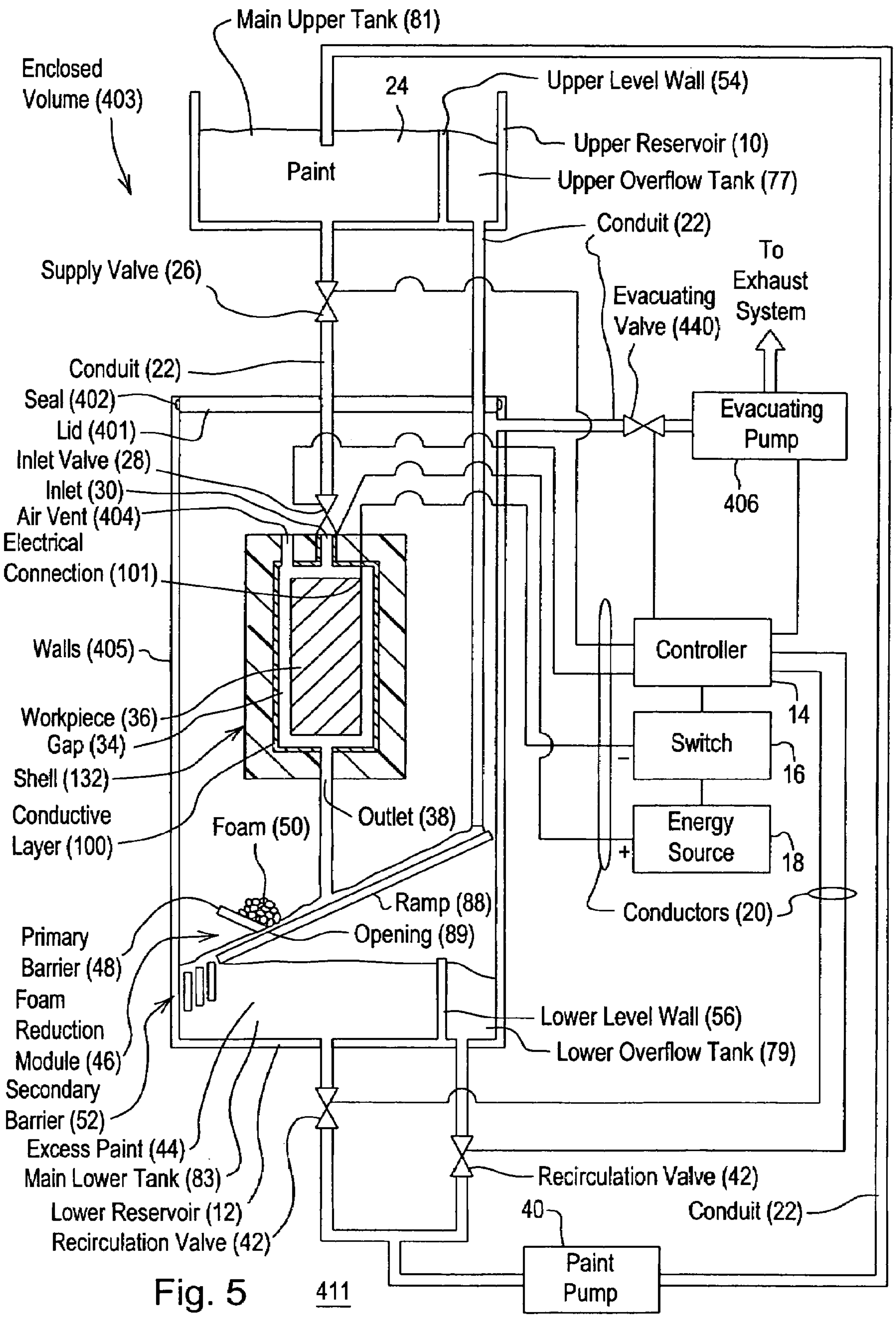
FIG. 5 is a block diagram of a fifth embodiment of a system for coating a desired portion of the workpiece with a layer of paint.

The coating system 411 of FIG. 5 is similar to the coating system 311 of FIG. 4, except the coating system 411 of FIG. 5 further features a conductive layer 100 lining the female shell 132. Like reference numbers in FIG. 4 and FIG. 5 indicate like elements.

The conductive layer 100 may be formed on an interior of the shell 132 by electroless deposition, chemical vapor deposition, sputtering, electroplating, or otherwise. The conductive layer 100 of FIG. 5 may be electrically charged relative to the workpiece 36 to improve the transfer of electrical charges to the paint particles or its solvent (e.g., an aqueous solvent), and hence, the paint's electrostatic attraction to the workpiece 36 or the paint's electro-deposition on the workpiece 36. Electrical energy may be fed to the conductive layer 100 via a conductor 20 coupled to the energy source 18 or the switch 16. The conductor 20 is mechanically and electrically connected to the conductive layer 100 at an electrical connection 101, for instance.

Figure 6:
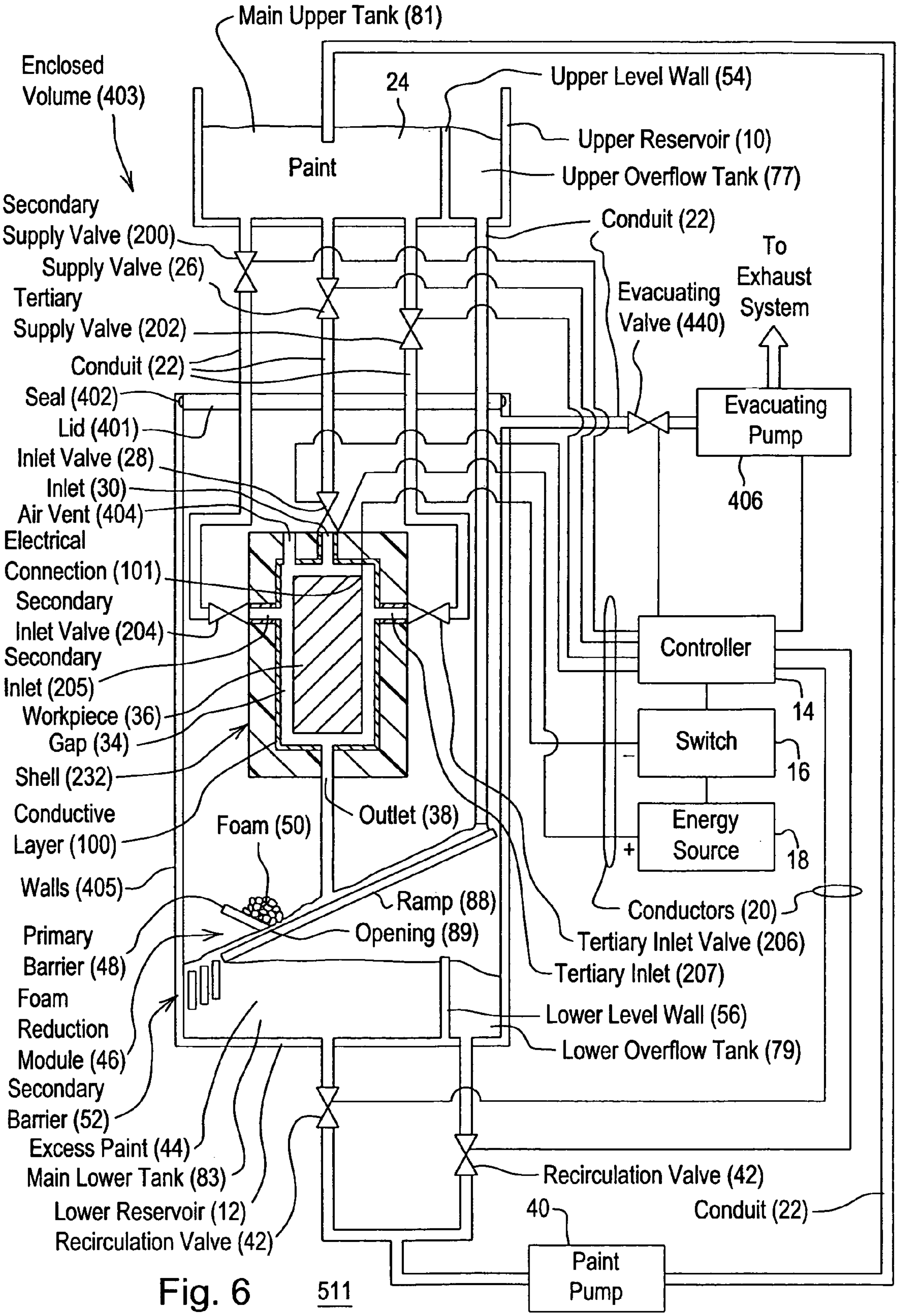
FIG. 6 is a block diagram of a sixth embodiment of a system for coating a desired portion of the workpiece with a layer of paint.

The coating system 511 of FIG. 6 is similar to the coating system 411 of FIG. 5, except the coating system 511 of FIG. 6 further features multiple inlets (30, 205, 207) into an interior of the shell 232. Like reference numbers in FIG. 3, FIG. 5 and FIG. 6 indicate like elements.

The shell 232 has an inlet 30, a secondary inlet 205 and a tertiary inlet 207. The inlet 30 is associated with an inlet valve 28 for controlling the flow or volume of paint entering into an interior of the shell 232. The secondary inlet 205 is associated with a secondary inlet valve 204 for controlling the flow or volume of paint entering into an interior of the shell 232; and the tertiary inlet 207 is associated with a tertiary inlet valve 206 for controlling the flow or volume of paint entering into an interior of the shell 232. The flow rate of paint may be adjusted by one or more of the inlet valves (28, 204, and 206) to increase or decrease the rate at which a workpiece 36 (or a particular portion of the workpiece downstream of the corresponding inlet) is painted or coated. As shown in FIG. 3, aggregate flow rate permitted by multiple inlets (30, 205, 207) potentially supports the painting or coating of a greater quantity of workpieces 36 per unit time than with a single inlet 30 of similar dimensions does.

The evacuating pump 406 may be coupled to the enclosed volume 403 via an evacuating valve 440 and conduit, as previously described in conjunction with FIG. 4.

In an alternate embodiment, if the conductive layer 100 were not present in the coating system 511, each inlet (e.g., inlet 30, secondary inlet 205, and the tertiary inlet 207) could be connected to a terminal of the energy source 18 to provide an electric field between each inlet and the workpiece 36 in the vicinity of the inlets (e.g., for coating a specific targeted area of the workpiece 36 with paint). Areas of the workpiece 36 that are not exposed to a sufficient electric field for a desired thickness of paint deposition near the inlets might be masked to prevent the deposition of paint, for example.

Figure 7:
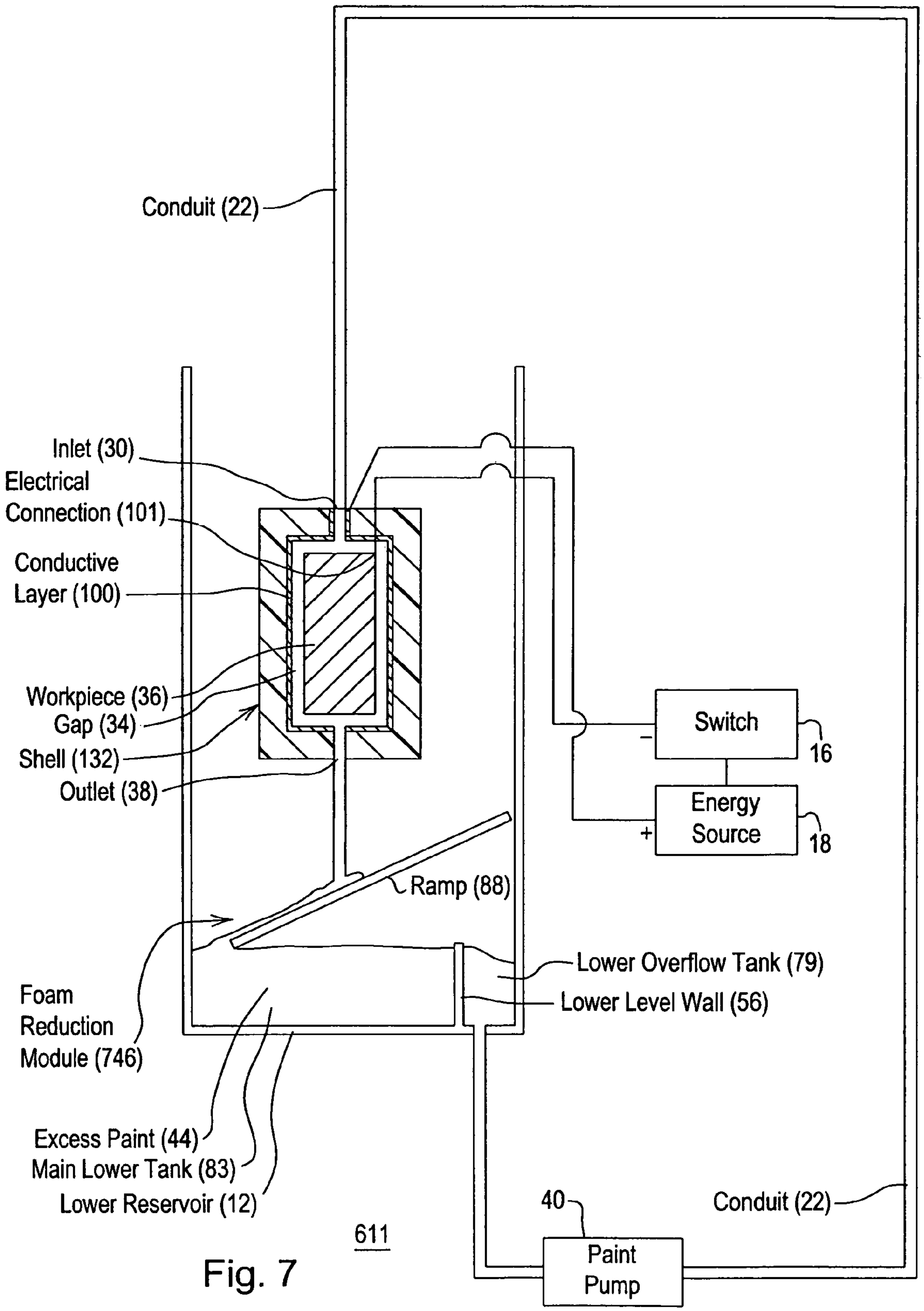
FIG. 7 is a block diagram of a seventh embodiment of a system for coating a desired portion of the workpiece with a layer of paint.

FIG. 7 shows a basic embodiment of a coating system 611 for coating a desired portion of a workpiece with a layer of paint. The coating system 611 of FIG. 7 is similar to the coating system 111 of FIG. 2, except that the coating system 611 deletes the upper reservoir 10, the controller 14, the valves (26, 28, and 42), the primary barrier 48, and the secondary barrier 52. Like reference numbers in FIG. 7 and FIG. 2 indicate like elements.

The coating system 611 comprises a source or emitter of paint. Here, the source or emitter of paint comprises a conduit 22 which is fed by paint pump 40. The conduit 22 directs the flow of paint into the inlet 30 and interior of the female shell 132. The female shell 132 has a conductive layer 100 that lines the shell. The female shell 132 has at least two sections joined together to generally surround the workpiece 36 with a gap 34 (e.g., an air gap). The female shell 132 has an outlet near its lower portion or bottom. The two sections of the female shell 132 are associated with a seal to hermetically seal the gap 34 such that the paint exits from the outlet 38 of the female shell 132.

The paint exiting the outlet 38 falls onto the ramp 88 or foam reduction module 746. Because the paint strikes the ramp 88, and not the excess paint 44 in the lower reservoir 12, foam formation is reduced or prevented. Accordingly, the foam reduction module 746 represents an illustrative example of single-stage foam reduction module 746, where the stages associated with the primary barrier 48 and the secondary barrier 52 are absent.

Figure 8:
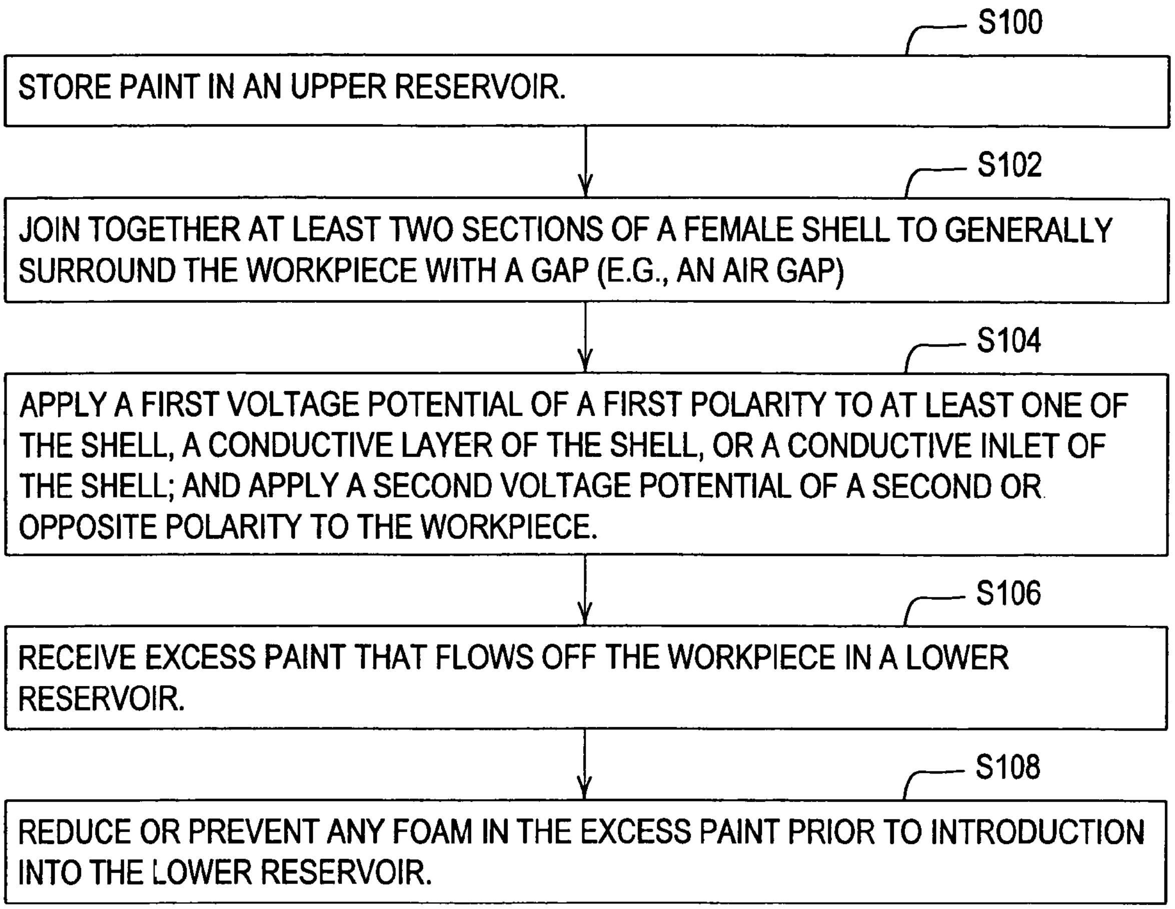
FIG. 8 is a flow chart of one embodiment of a method for coating a desired portion of the workpiece with a layer of paint.

FIG. 8 illustrates one embodiment of a method of coating a workpiece 36 that may use any of the embodiments of FIG. 1 through FIG. 7. The method of FIG. 8 begins in step S100.

In step S100, paint is stored in an upper reservoir 10. A user or robot may fill the upper reservoir 10 with paint at the beginning of a coating process or from time to time (e.g., periodically) as the paint is depleted by application to workpieces.

In step S102, a user or robot (e.g., robotic arm) places the workpiece 36 in a female shell (32, 132, or 232) that has at least two sections joined together to generally surround the workpiece 36 with a gap 34. For example, the two sections may be connected by hinges and latches, placed together by linear motors, joined by compression clamps or bands, or otherwise. Although it is not shown, a first section of the shell (32, 132, or 232) may have a pin that interlocks with a corresponding receptacle in the second section of the shell (32, 132 or 232). It is understood that prior step S102, the workpiece 36 may be prepared by cleaning and/or application of a phosphate coating to metal, alloy or metallic surfaces of the workpiece 36.

In step S104, a first voltage of a first polarity (e.g., positive or negative) is applied to at least one of the shell (32, 132 or 232), a conductive layer 100 of the shell, or a conductive inlet (e.g., 30) of the shell; and a ground or a second voltage of a second polarity is provided to the workpiece 36. The second polarity is different from the first polarity. The second polarity may be opposite in polarity from the first polarity or neutral. Step S104 may be carried out in accordance with various techniques. In accordance with a first technique, a first voltage of a first polarity (e.g., positive or negative) is applied to one or more conductive inlets 30 (e.g., an inlet with a conductive lining) to create an electrical field in the vicinity of one or more inlets 30, whereas a second voltage of a second polarity, opposite to the first polarity, is applied to the workpiece 36. In accordance with a second technique, a first voltage of a first polarity is applied to multiple inlets (30, 205, 207) with corresponding conductive linings to create an electrical field in the vicinity of one or more inlets, whereas a second voltage of a second polarity (or opposite polarity to the first polarity) is applied to the workpiece 36. In accordance with a third technique, the first voltage of a first polarity is applied (directly or indirectly) to the conductive layer 100 within the shell (132 or 232) to impart some electrical charge or electrostatic attraction on the paint (or its solvent or constituents) in the gap 34, whereas a second voltage of second polarity (or opposite voltage polarity to the first voltage) is applied to the workpiece 36. For example, the first voltage may be applied to the conductive layer 100 via a conductive inlet (e.g., 30) that has an electrical connection and/or mechanical connection to the conductive layer 100.

In step S106, excess paint 44 is received or flows off of the workpiece 36 into a lower reservoir 12. For instance, the excess paint drains from the outlet 38. After a known or generally fixed volume of paint is introduced into the gap 34 within the shell (32, 132 or 232), the controller 14 commands one or more inlet valves (30, 205, 207) to be closed or shut off. However, some excess paint 44 may drain from the outlet 38 even after the inlet valves are closed or shut.

Step S108 may occur prior to, during, or after step S106. In step S108, foam is reduced or prevented in the excess paint 44 prior to the introduction of paint into the lower reservoir 12. In one configuration, a sloped or tilted ramp 88 with primary barrier 48 receives excess paint from the outlet 38. The primary barrier 48 has a lower portion with an opening 89 and an upper portion. The lower portion or opening 89 allows paint to travel through to the lower reservoir 12, whereas the upper portion of the primary barrier 48 blocks or traps foam 50 or air bubbles in the excess paint 44. At the end of the ramp 88, a secondary barrier 52 prevents turbulence from the paint entering the lower reservoir 12 from the ramp 88.

Figure 9:
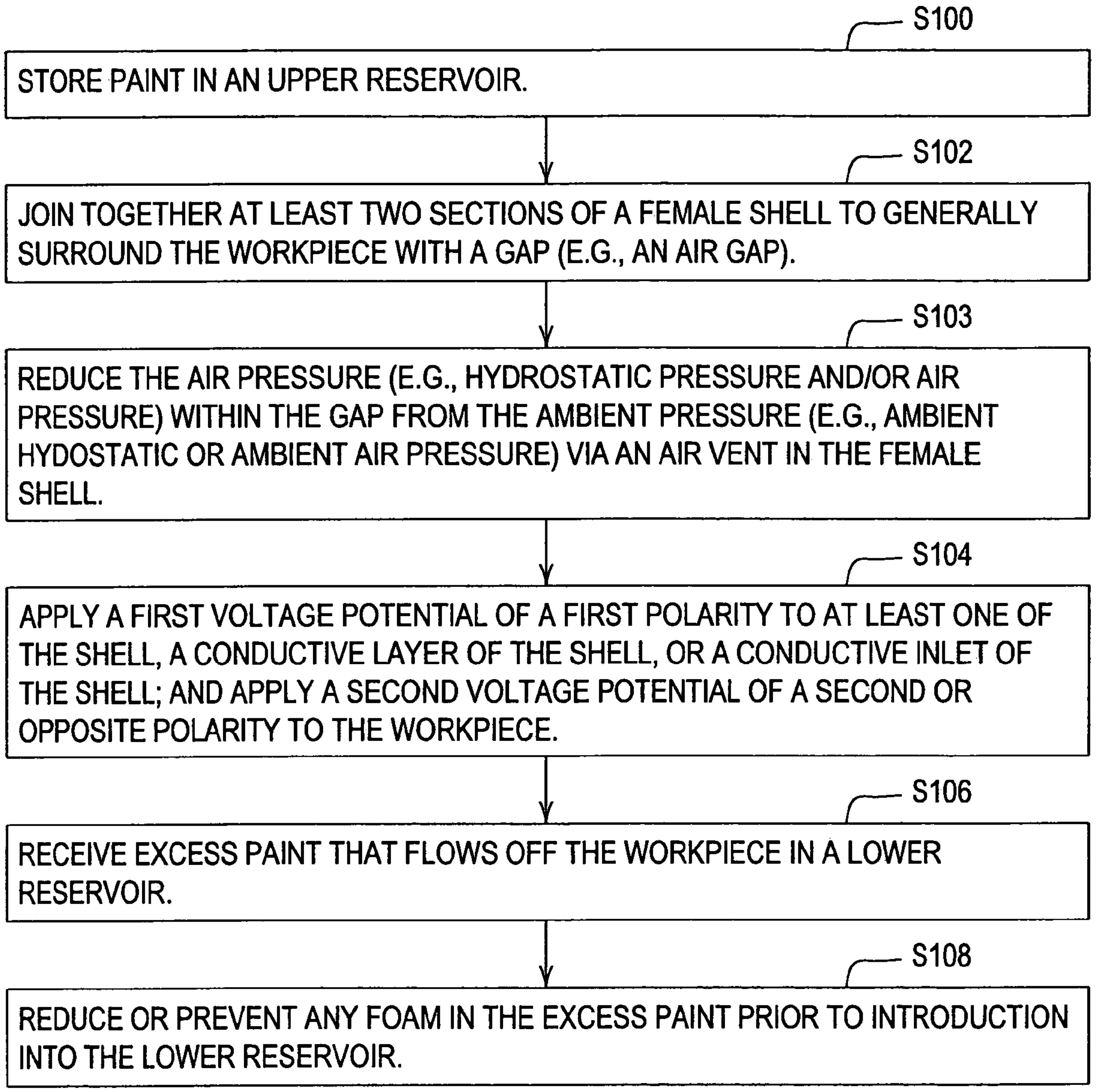
FIG. 9 is a flow chart of another embodiment of a method for coating a desired portion of the workpiece with a layer of paint.

The method of FIG. 9 is similar to the method of FIG. 8, except the method of FIG. 9 further includes step S103. In step S103, the pressure (e.g., air pressure, hydrostatic pressure, or both) is reduced within the gap 34 in the shell from the ambient or prevailing pressure (e.g., ambient air pressure and/or prevailing hydrostatic pressure) via an air vent 404 in the female shell (32, 132 or 232). To carry out step S103, the shell (32, 132 or 232) may be surrounded or enclosed by an enclosed volume 403, which is hermetically sealed and evacuated to have an air pressure less than the ambient air pressure of the outside environment around the coating system.

Figure 10:
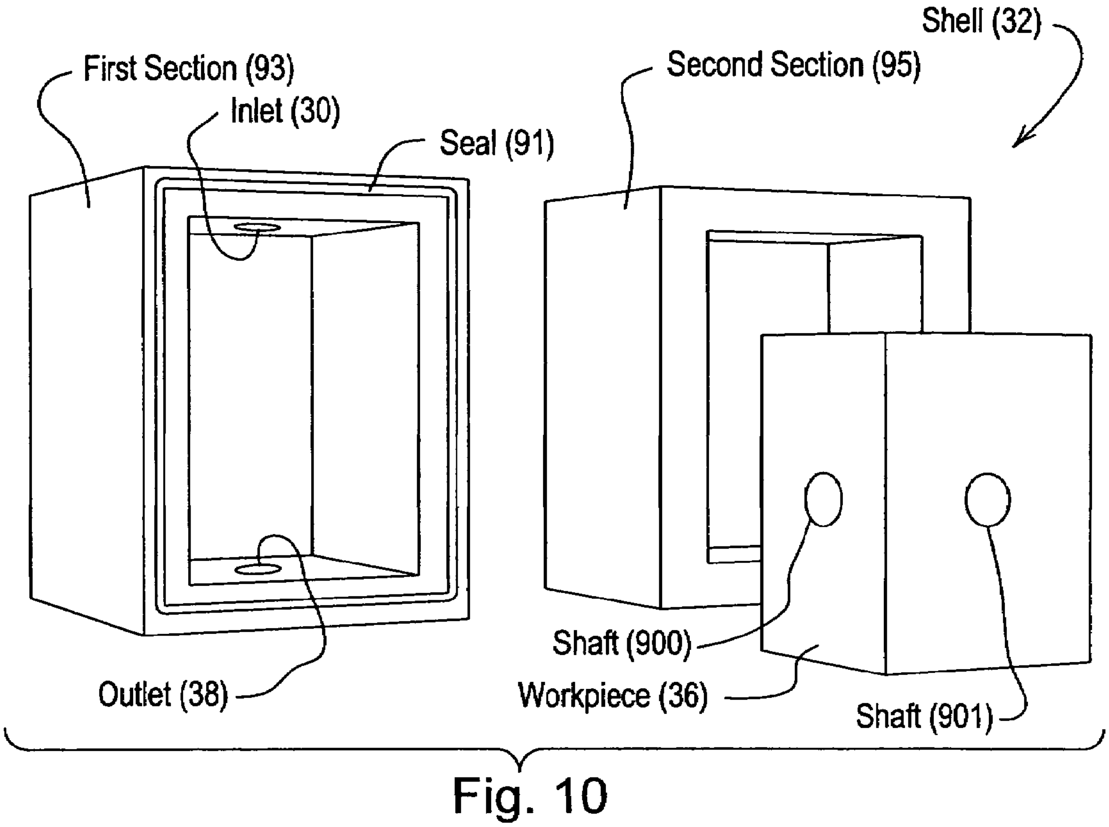
FIG. 10 shows an illustrative embodiment of the female shell and a workpiece.

FIG. 10 provides a perspective view of a first section 93 of one illustrative example of a female shell 32, a second section 95 of one illustrative example of the female shell 32, and one example of an illustrative workpiece 36. As shown, the first section 93 of the female shell 32 may comprise a lip seal 91 that mates with a surface of the second section 95 of the female shell 32 to provide a hermetically sealed environmental for introduction of paint into the female shell 32, consisting of the joined first section 93 and second section 95. The first section 93 of the female shell 32 has an inlet 30 and the second section 95 has an outlet 38. Although the workpiece 36 is shown as a gearbox having two shafts (900, 901), the method and system disclosed herein may be practiced with virtually any workpiece 36.

Figure 11:
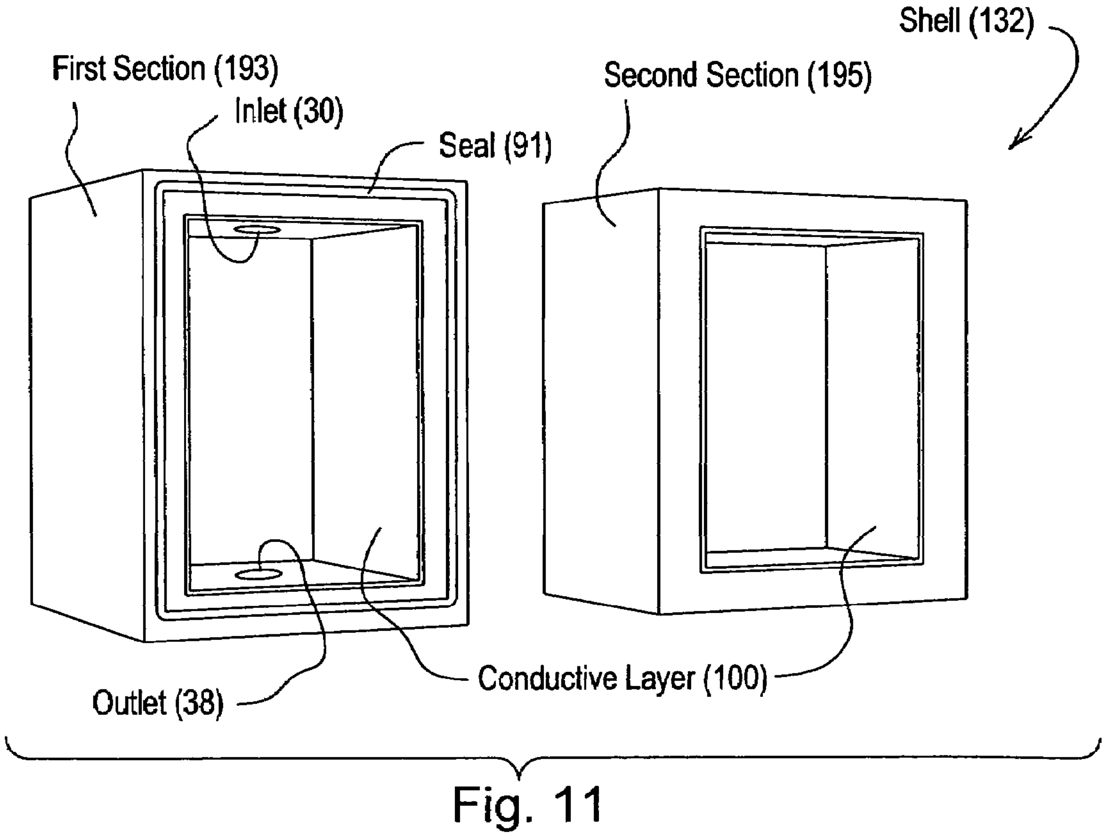
FIG. 11 shows an alternate illustrative embodiment of the female shell and a workpiece.

The example of FIG. 11 is similar to the example of FIG. 10, except the example of FIG. 11 further includes a conductive layer 100 lining the interior of one illustrative example of a female shell 132, which comprises a first section 193 and a second section 195 of one illustrative example of the female shell 132. Like reference numbers in FIG. 10 and FIG. 11 indicate like elements. The conductive layer 100 is consistent with the embodiments of FIG. 2 and FIG. 5, for example.

Having described the preferred embodiment, it will become apparent that various modifications can be made without departing from the scope of the invention as defined in the accompanying claims.

The following is claimed:

1. A system for coating a desired portion of the workpiece with a layer of paint, the system comprising:
- an upper reservoir for storing paint;
- a female shell having at least two sections joined together to generally surround the workpiece with a gap, wherein the female shell is configured to receive the paint from the upper reservoir;
- an energy source for applying a first voltage of a first polarity to at least one of the female shell, a conductive layer associated with the female shell, and a conductive inlet of the female shell, and providing a ground or a second voltage of second polarity, different than the first polarity, to the workpiece;
- a lower reservoir that is configured to receive excess paint that flows off the workpiece within the female shell; and
- a foam reduction module for receiving the excess paint positioned between the workpiece and the lower reservoir, wherein the foam reduction module comprises a sloped ramp and a primary barrier, the primary barrier having a lower portion with an opening for the paint and an upper portion to capture air bubbles or foam in the paint.

2. The system according to claim 1 further comprising a paint pump for recycling the excess paint to the upper reservoir from the lower reservoir.

3. The system according to claim 1 further comprising an evacuating pump for reducing the pressure of the gap to below an ambient atmospheric pressure.

4. The system according to claim 3 further comprising:
- a lid for enclosing the lower reservoir, the foam reduction module, and the female shell in an enclosed volume;
- a seal for hermetically sealing the lid to support a pressure differential between the enclosed volume and the ambient atmospheric pressure; and
- an air vent in the female shell for reducing the ambient pressure within the gap to that within the enclosed volume.

5. The system according to claim 4 further comprising:
- a shell seal associated with one section of the female shell for hermetically sealing the section to another section of the female shell.

6. The system according to claim 1 wherein the female shell has an interior surface that generally conforms to an exterior surface of the workpiece such that the gap has a generally uniform thickness, where the uniform thickness is measured from a normal projection from at least one of the exterior surface and the interior surface.

7. The system according to claim 1 further comprising one or more seals mounted in the female shell to protect an exterior shaft associated with the workpiece from receiving paint.

8. The system according to claim 1 wherein the female shell is molded from the workpiece having a coating of a desired thickness.

9. The system according to claim 1 wherein the foam reduction module comprises a sloped ramp having a secondary barrier at or near an end of the ramp, the secondary barrier comprising a series of plates oriented generally perpendicularly to a direction of flow of paint, the plates spaced horizontally apart from each other.

10. The system according to claim 1 wherein an interior surface of the female shell is generally coated with a metallic layer as the conductive layer.

11. The system according to claim 1 wherein the female shell comprises an outlet for discharging paint.

12. The system according to claim 1 wherein the female shell has multiple inlets for receiving paint and an outlet for discharging paint, each inlet associated with a valve for controlling the supply of paint to the workpiece; one of the multiple inlets comprising the conductive inlet.

13. A method for coating a desired portion of the workpiece with a layer of paint, the method comprising:

providing a supply of paint;

joining together at least two sections of a female shell to generally surround the workpiece with a gap;

filling the gap of the female shell with the paint;

applying a first voltage to at least one of the female shell, a conductive layer of the female shell, and a conductive inlet of the female shell, and providing a ground or a second voltage of different polarity with respect to the first voltage to the workpiece;

receiving excess paint that flows off the workpiece in a lower reservoir; and reducing any foam in the excess paint prior to introduction into the lower reservoir, wherein the reducing comprises placing a primary barrier associated with a sloped ramp in the path of the excess paint, the primary barrier having a lower portion with an opening for the paint and an upper portion to capture air bubbles or foam.

14. The method according to claim 13 wherein the providing the supply of paint comprises storing paint in an upper reservoir.

15. The method according to claim 14 further comprising recycling the excess paint to the upper reservoir from the lower reservoir.

16. The method according to claim 13 further comprising reducing the pressure of the gap to below an ambient atmospheric pressure.

17. The method according to claim 15 wherein reducing the pressure comprises the steps of:

enclosing the lower reservoir, a foam reduction module, and the female shell in an enclosed volume;

hermetically sealing the enclosed volume to support a pressure differential between the enclosed volume and the ambient atmospheric pressure; and reducing the ambient pressure within the gap to that within the enclosed volume.

18. The method according to claim 13 wherein the female shell has an interior surface that generally conforms to an exterior surface of the workpiece such that the gap has a generally uniform thickness, where the uniform thickness is measured from a normal projection from at least one of the exterior surface and the interior surface.

19. The method according to claim 13 further comprising mounting one or more seals in the female shell to protect an exterior shaft associated with the workpiece from receiving paint.

20. The method according to claim 13 further comprising molding the female shell from the workpiece having a coating of a desired thickness.

21. The method according to claim 13 wherein the reducing comprises placing a secondary barrier associated with an end of a sloped ramp, the secondary barrier having series of plates spaced apart by a horizontal spacing.

22. The method according to claim 13 further comprising forming a metallic layer, as the conductive layer, on an interior surface of the female shell.

* * * * *